Sept. 6, 1938.  H. NAGEL  2,129,229
CAMERA WITH RANGE FINDER
Filed March 5, 1937
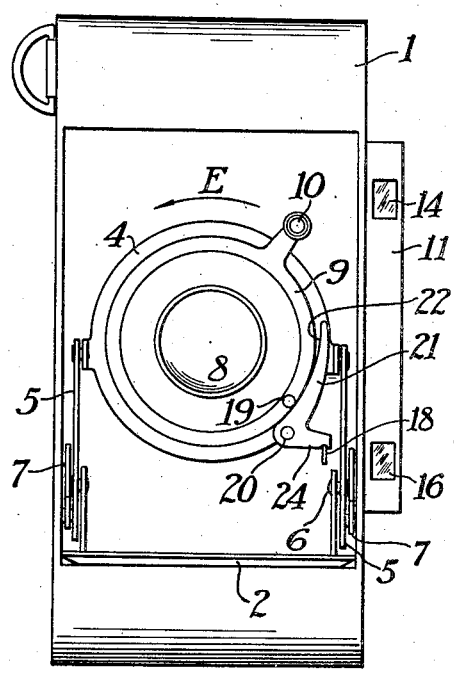
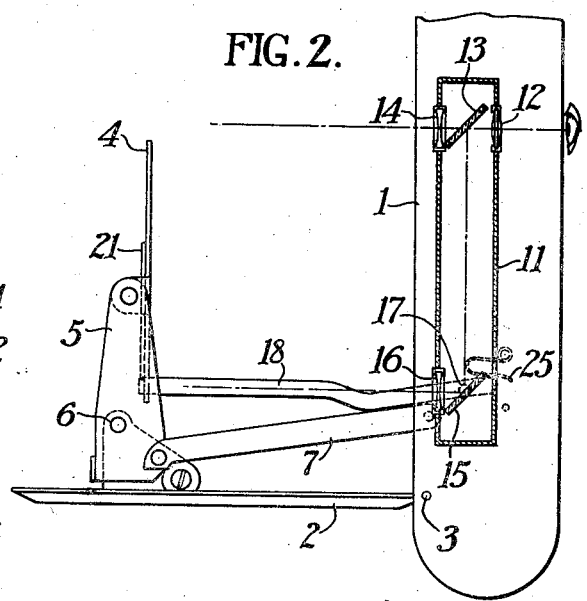
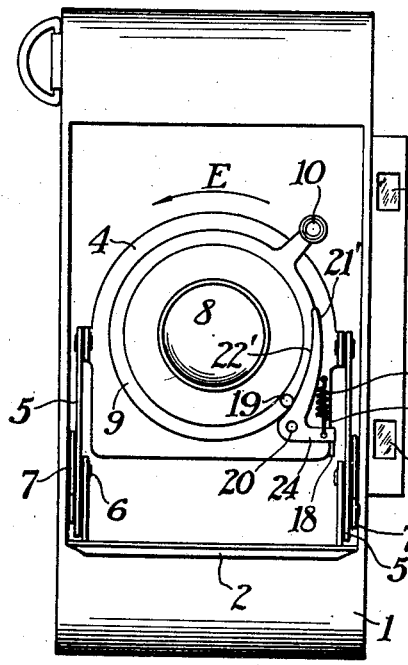
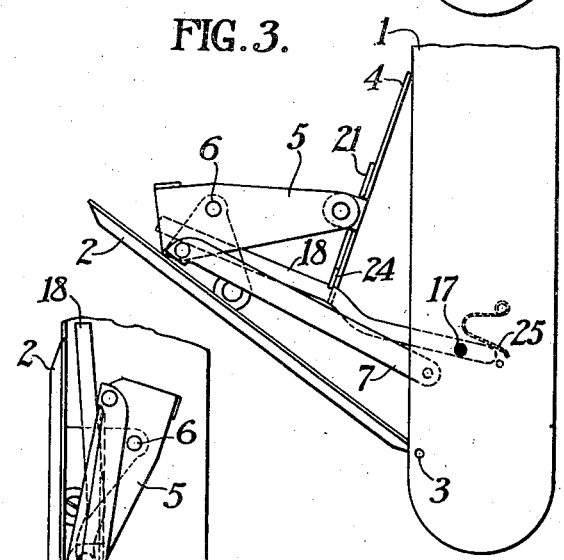
Hugo Nagel
INVENTOR.
BY Newton M. Perrins
Donald H. Stewart
ATTORNEYS Patented Sept. 6, 1938

2,129,229

UNITED STATES PATENT OFFICE 2,129,229

CAMERA WITH RANGE FINDER

Hugo Nagel, Harrow, England, assignor to Eastman Kodak Company, Rochester, N. Y., a corporation of New Jersey Application March 5, 1937, Serial No. 129,243
In Great Britain April 7, 1936

2 Claims. (Cl. 95—44)

This invention relates to cameras having range finders coupled therewith.

Cameras of the folding bed type may be divided into two classes; first, those which focus by moving the objective mount with respect to the camera housing (i. e. the sliding bed type); second, those which focus by rotating the lens or a portion of it, which is mounted on a screw with respect to the lens board. In connection with cameras of the sliding bed type, many methods have been proposed whereby the adjusting movement of the camera bed may be coupled with the light deviating means of a range finder.

It is an object of the invention to provide a coupling means between the range finder light deviator and the camera focusing adjuster on cameras of the objective focusing type.

It is a special object of the invention to provide a coupling means which employs a cam whereby a relatively large movement of the focusing adjuster with respect to the cam surface, produces a relatively small movement of the range finder light deviating means. As a result of this feature of the invention, it is possible to employ a cam which is simple to manufacture and gives accurate results.

It is a further object of the invention to provide a coupling means whereby a range finder may be readily adapted to many of the existing objective focusing type cameras. If this adaptation is made during the manufacturing stages, it will be necessary to alter the production tools for the camera parts only a negligible amount. A different shape cam would probably be required for each type of camera, but, according to the invention the arrangement is such that this cam is not difficult to make.

Other objects and advantages of the invention will be apparent from the accompanying drawing in which similar reference numerals indicate similar details and in which, Fig. 1 is a front elevation of a camera employing one embodiment of the invention.

Fig. 2 is a side elevation of the arrangement shown in Fig. 1.

Figs. 3 and 4 are side elevations illustrating how the camera shown in Figs. 1 and 2 operates when being closed.

Fig. 5 is a front elevation showing another embodiment of the invention.

In Figs. 1 and 2, a camera is shown having a housing 1 and a folding bed 2 hingedly attached to the housing at the point 3. The camera has a self-erecting feature of a well-known type comprising a lens mount 4 rotatably attached to a support 5 which is pivoted about a point 6 and is brought into operative position by an erecting bar 7 when the camera is opened. The self erecting front mechanism is not shown in great detail as it permits the invention to be more clearly shown, but it may be of any well known or suitable type. A lens 8 carried by the lens mount 4 may be focused in a well-known manner by rotating a ring 9 by means of a handle 10 in the direction of the arrow E. Any suitable type of rotating member may be employed without departing from the spirit of the invention.

A range finder of any suitable type such as that shown at 11 is secured to the camera housing 1. The range finder 11 comprises an eye-piece 12, two front windows 14 and 16, a fixed semitransparent mirror 13, and a reflector 15 rotatably mounted on a shaft 17 to operate as the light deviating means of the range finder.

The shaft 17 projects through the camera housing 1 and supports a lever arm 18 which extends toward the front of the camera and, when the camera is in operative position, engages a notch in one arm 24 of a bell-crank lever pivotally secured by a pivot 20 to the lens mount 4. The lever arm 18 is urged into engagement with this bell-crank lever arm 24 by means of a spring 25 secured to the camera housing 1.

The other arm 21 of the bell-crank lever comprises a cam shaped member having a cam surface 22 which engages a small lug 19 mounted on the focusing ring 9.

When the camera objective is focused by rotating the ring 9 in the direction of the arrow E, the cam surface 22 is maintained in engagement with the lug 19 on the ring 9 by the tension of the spring 25 transmitted through the lever arm 18 and the bell-crank arm 24. Thus, rotation of the ring 9 and its lug 19 produces a relatively small predetermined amount of rotation of the bell-crank lever comprising arms 21 and 24. This movement is transmitted through the lever arm 18 to its supporting shaft 17 whereby the range finder light deviating means 15 is adjusted.

If the lug 19 were absent, the circular periphery of the ring 9 would not serve to actuate a cam in contact therewith, since this periphery is concentric with the axis of rotation of the ring. Any interruption in this periphery or any member such as lug 19 which engages the cam surface 22 with a surface non-concentric with the axis will actuate the cam. In practice, the cam actuating surface must have at least two points at different distances from the axis, i. e., the surface must vary radially with respect to the axis. This radial variation is of course with longitude measured in the usual way along any concentric circle and is not a variation with time.

It is to be understood that the range finder light deviating means may be of any suitable type such as a rotating wedge with suitable coupling means without departing from the spirit of the invention.

As shown in Figs. 3 and 4, the lever arm 18 is so shaped that it does not interfere with the closing or opening of the camera and is automatically brought into operative position when the camera is opened. During the opening and closing of the camera, the relative movements of the lens board 4, the support 5 and the erecting arm 7, are well known to those skilled in the art. As the camera is closed the end 24 of the bell-crank lever slides along the upper edge of the lever arm 18 which is so shaped that no interference arises between it and the camera bed 2 which rotates about the point 3. When the camera is completely closed, the lever arm 18 lies between the lens 8 and the pivot which attaches the lens mount 4 to the support 5. Various alternative arrangements of these members which will suggest themselves to those skilled in the art, may be used without departing from the spirit of this invention.

Fig. 5 shows a similar arrangement of the invention having a somewhat different form of engagement between the lever arm 18 and the bell crank arm 24 (i. e. the notch grip is eliminated). In this alternative arrangement, the lens mount 4 extends downward and has an edge 26 against which lever arm 18 rests and is held by its own inherent resilience. This edge 26 may be formed as a shallow elongated notch in the lens mount 4 whereby upper and lower limits for the vertical motion of the lever arm 18 are provided.

In either embodiment of the invention shown, an additional spring 27 may be mounted on the lens mount 4 to assist the spring 25 in maintaining the bell crank lever cam 22 in engagement with the lug 19 on the focusing ring 9. In practice, these two added features shown in Fig. 5, provide a more positive control of the adjustment of the range finder light deviating means relative to the motion of the focusing adjuster 9.

By using this invention, it is possible to convert many types of objective focusing cameras without a range finder to cameras having a range finder coupled therewith. As pointed out above it is usually necessary to employ a different cam for each type of lens and focusing adjuster. The mounting of the bell-crank lever on the lens board and the lug 19 on the focusing ring is, in most cases, a relatively simple matter. It is also usually practical to attach a housing 11 to the side of a camera not originally intended for range finders.

Having thus described embodiments of the invention, I wish to point out that it is not limited to the structures shown but is of the scope of the appended claims.

What I claim and wish to protect by Letters Patent of the United States is:

1. In combination with a camera of the focusing objective type and having a housing, a bed hingedly attached to the housing, a lens board supporting the objective, a support for the lens board mounted on the camera bed, a rotatable member mounted on the lens board for focusing the objective, said rotatable member having a cam follower whose cam contacting surface varies radially with longitude with respect to the axis of rotation, a cam parallel to the plane of rotation of said member also mounted on the lens board and non-concentrically engaging the cam follower to be moved thereby, a range finder mounted on the camera housing and having a light deviating means, and a member pivotally secured to the camera housing engaging the cam and the range finder light deviating means whereby rotation of the focusing member is transmitted in a predetermined manner by the cam to adjust the range finder light deviating means.

2. In combination with a camera of the focusing objective type and having a housing, a bed hingedly attached to the housing, a lens board supporting the objective, a support for the lens board mounted on the camera bed, a rotatable member mounted on the lens board for focusing the objective, said rotatable member having a cam follower whose cam contacting surface varies radially with longitude with respect to the axis of rotation, a bell crank lever having a cam surface so mounted on the lens board that the cam surface engages laterally and non-concentrically the cam follower, a range finder mounted on the camera housing and having a light deviating means, a shaft through the camera housing engaging the light deviating means and a lever secured to said shaft, extending toward the lens mount and engaging the bell crank lever whereby movement of the rotatable focusing member is transmitted in a predetermined manner by the cam, the bell crank lever, the lever secured to said shaft and the shaft to adjust the range finder light deviating means.

HUGO NAGEL.